(12) United States Patent
Cho et al.

(10) Patent No.: US 8,854,592 B2
(45) Date of Patent: Oct. 7, 2014

(54) LIQUID CRYSTAL DISPLAY AND MANUFACTURING METHOD THEREOF

(75) Inventors: Yun-Jung Cho, Asan-si (KR); Seon-Kyoon Mok, Hwaseong-si (KR); Eun Cho, Cheonan-si (KR); Byoung-Sun Na, Hwaseong-si (KR); Sung-Jae Moon, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 928 days.

(21) Appl. No.: 12/764,745

(22) Filed: Apr. 21, 2010

(65) Prior Publication Data

US 2011/0074748 A1 Mar. 31, 2011

(30) Foreign Application Priority Data

Sep. 25, 2009 (KR) .......... 10-2009-0091160

(51) Int. Cl.
| | |
|---|---|
| *G02F 1/1339* | (2006.01) |
| *G02F 1/1337* | (2006.01) |
| *G02F 1/1345* | (2006.01) |
| *G02F 1/1333* | (2006.01) |
| *G09G 3/36* | (2006.01) |

(52) U.S. Cl.
CPC .. *G02F 1/133723* (2013.01); *G09G 2300/0426* (2013.01); *G02F 1/13454* (2013.01); *G02F 2001/133388* (2013.01); *G09G 3/3677* (2013.01)
USPC .......... 349/153; 349/123; 349/151; 345/204; 345/205

(58) Field of Classification Search
USPC .......... 349/123, 149, 151, 153, 158; 345/204–206
See application file for complete search history.

(56) References Cited

U.S. PATENT DOCUMENTS

| | | | | |
|---|---|---|---|---|
| 7,417,702 | B2* | 8/2008 | Yamazaki | 349/153 |
| 2006/0077334 | A1* | 4/2006 | Kim et al. | 349/153 |
| 2006/0103802 | A1* | 5/2006 | Miki et al. | 349/153 |
| 2007/0064176 | A1* | 3/2007 | Kubota et al. | 349/93 |
| 2008/0012797 | A1* | 1/2008 | Kil | 345/63 |

* cited by examiner

*Primary Examiner* — Nathanael R Briggs
(74) *Attorney, Agent, or Firm* — F. Chau & Associates, LLC

(57) ABSTRACT

A liquid crystal display includes a lower panel and an upper panel facing each other. A liquid crystal layer is interposed between the lower panel and the upper panel. An attachment member attaches the lower panel and the upper panel and encloses the liquid crystal layer. A gate driver is integrated on the lower panel. The gate driver generates a gate signal and includes a plurality of stages. A plurality of control signal lines transmit a control signal to the gate driver. A passivation layer is disposed on the gate driver and the plurality of control signal lines. An alignment layer is disposed on the passivation layer and completely covers the gate driver and the plurality of control signal lines. The alignment layer includes a first region and a second region connected to the first region. The second region extends to an edge of the lower panel.

15 Claims, 8 Drawing Sheets

LIQUID CRYSTAL DISPLAY AND MANUFACTURING METHOD THEREOF

CROSS-REFERENCE TO RELATED APPLICATION

This application claims priority to Korean Patent Application No. 10-2009-0091160 filed in the Korean Intellectual Property Office on Sep. 25, 2009, the entire contents of which are incorporated herein by reference.

BACKGROUND OF THE INVENTION (a) Technical Field

The present invention relates to a display device, and more particularly, to a liquid crystal display and a manufacturing method thereof.

(b) Discussion of the Related Art

A liquid crystal display (LCD) is one of the most widely used flat panel displays (FPD). An LCD is composed of two display panels on which field generating electrodes such as pixel electrodes and a common electrode are formed and a liquid crystal layer interposed between the two display panels. In the liquid crystal display, voltages are applied to the field generating electrodes so as to generate an electric field over the liquid crystal layer and then the alignment of liquid crystal molecules of the liquid crystal layer is determined by the electric field. Accordingly, the polarization of incident light is controlled, thereby performing image display.

The liquid crystal displays include switching elements connected to each of pixel electrodes and a plurality of signal lines, such as gate lines and data lines, to apply voltages to the pixel electrodes by controlling the switching elements. The gate lines transmit gate signals generated by a gate driving circuit, the data lines transmit data voltages generated by a data driving circuit, and the switching elements transmit the data voltages to the pixel electrodes according to the gate signals.

The gate driver and the data driver may be mounted on the display device as an IC chip type, may be mounted on a flexible printed circuit film as a tape carrier package (TCP) type and attached to the display device, or may be mounted on a printed circuit board (PCB). Particularly, the gate driver may be integrated into one of the display panel of the liquid crystal display by forming the gate driver with the same process that is used to form the display signal lines and the switching elements.

When the gate driver is integrated into one of the display panels, the gate driver receives control signals through several wires integrated in the display panel, and the several wires may be formed with different layers.

When the different wires transmitting the control signals of the gate driver are formed with the different layers thereby intersecting and overlapping each other, a short circuit between the wires may be generated such that the reliability of the liquid crystal display as well as the gate driver may be decreased.

SUMMARY OF THE INVENTION

A liquid crystal display according to an exemplary embodiment of the present invention includes a lower panel and an upper panel facing each other. A liquid crystal layer is interposed between the lower panel and the upper panel. An attachment member attaches the lower panel and the upper panel to each other and encloses the liquid crystal layer. A gate driver is integrated on the lower panel. The gate driver generates a gate signal and includes a plurality of stages arranged in a first direction. A plurality of control signal lines transmit a control signal to the gate driver and extend in the first direction. A passivation layer is disposed on the gate driver and the plurality of control signal lines. An alignment layer is disposed on the passivation layer. The alignment layer aligns the liquid crystal layer and completely covers the gate driver and the plurality of control signal lines. The alignment layer includes a first region extending in a second direction, transverse to the first direction, and a second region connected to the first region in the first direction. The second region extends to an edge of the lower panel with respect to the second direction.

The attachment member may include first and second portions each arranged in the first direction and facing each other and third and fourth portions each arranged in the second direction and facing each other. The first region of the alignment layer may completely overlap each of the first and second portions of the attachment member in the second direction. A distance between an edge of the first region of the alignment layer with respect to the first direction and an edge of the first and second portions of the attachment member with respect to the first direction may be greater than a predetermined first distance.

The lower panel and the upper panel each may include a display area displaying an image and a peripheral area around the display area. The gate driver, the plurality of control signal lines, and the attachment member may be positioned in the peripheral area.

The gate driver may include an actual gate driver connected to a plurality of gate lines of the display area and transmitting the gate signal to the plurality of gate lines, and a dummy gate driver connected to the actual gate driver in the first direction.

The second region of the alignment layer may cover at least a portion of the dummy gate driver and at least a portion of the plurality of control signal lines disposed beside the dummy gate driver.

The plurality of control signal lines may include a first control signal line transmitting a first control signal and a second control signal line transmitting a second control signal that is different from the first control signal. The first control signal line and the second control signal line may be disposed under the passivation layer and at least a portion of the first control signal line may overlap the second control signal line via an insulating layer.

The liquid crystal display may further include a lower common electrode formed on the lower panel and transmitting a common voltage Vcom and an upper common electrode formed on the upper panel. The lower common electrode may be connected to the upper common electrode through a short portion. At least a portion of the short portion may overlap at least a portion of the third and fourth portions of the attachment member. The alignment layer does not overlap the short portion.

A manufacturing method of a liquid crystal display according to an exemplary embodiment of the present invention includes providing a first mother substrate. The first mother substrate is defined into a plurality of display areas arranged in a matrix and a plurality of peripheral areas around the display areas. A plurality of gate drivers and a plurality of control signal lines transmitting a control signal to the gate drivers are formed in the plurality of peripheral areas. A passivation layer is deposited on the gate driver and the control signal lines. An alignment layer completely covering the gate driver and the plurality of control signal lines is formed on the passivation layer. The alignment layer includes a plurality of first regions extending in a row direction and a plurality of second regions, each positioned between adjacent pairs of the first regions in a column direction. Each of the first regions covers the display areas disposed in one row of the matrix.

A second region of the plurality of second regions may connect the adjacent pairs of first regions in the column direction.

The method may further include providing a second mother substrate and forming a plurality of attachment members between the first mother substrate and the second mother substrate to attach the first mother substrate and the second mother substrate. The plurality of attachment members respectively enclose the plurality of display areas and the first region may completely overlap a portion of the attachment member in the column direction.

The method may further include forming a lower common electrode transmitting a common voltage Vcom on the first mother substrate. The second mother substrate may be provided such that it faces the first mother substrate. An upper common electrode may be formed on the second mother substrate. The lower common electrode and the upper common electrode may be combined through a short portion. The alignment layer does not overlap the short portion.

A manufacturing method of a liquid crystal display according to an exemplary embodiment of the present invention includes providing a mother substrate. The mother substrate is defined into a plurality of display areas arranged in a matrix and a plurality of peripheral areas around the display areas. A plurality of gate drivers and a plurality of control signal lines transmitting a control signal to the gate drivers are formed in the plurality of peripheral areas. A passivation layer is deposited on the gate driver and the control signal lines. An alignment layer completely covering the gate driver and the plurality of control signal lines is formed on the passivation layer. The alignment layer includes an opening positioned between neighboring pairs of the display areas in a column direction.

BRIEF DESCRIPTION OF THE DRAWINGS

The above and other features and aspects of the exemplary embodiments of the present invention will be described in detail with reference to the accompanying drawings, in which.

DETAILED DESCRIPTION OF EXEMPLARY EMBODIMENTS

Figure 1:
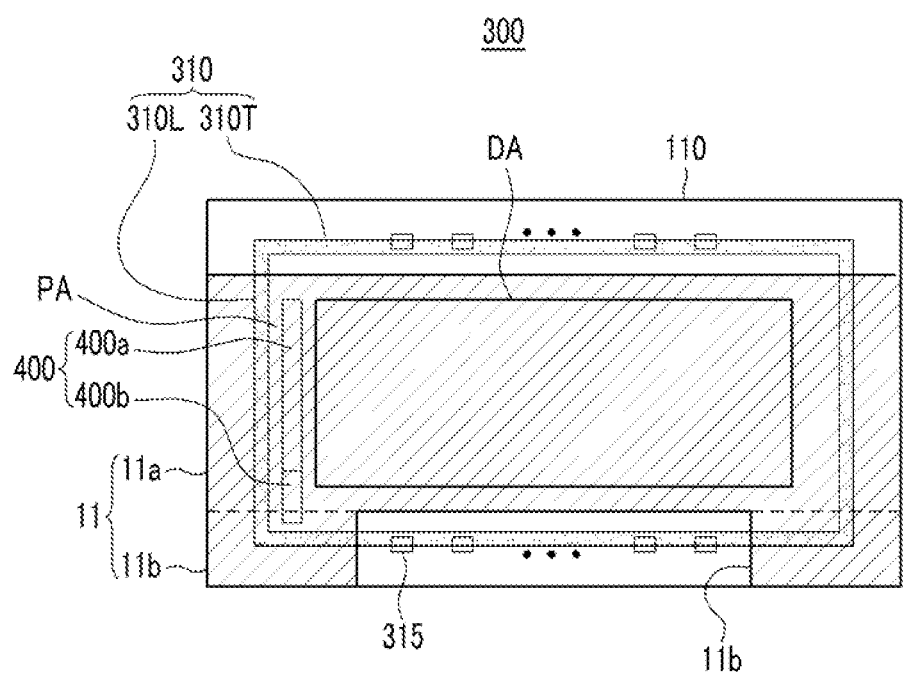
FIG. 1, FIG. 2, FIG. 3, and FIG. 4 are layout views each showing a liquid crystal display according to an exemplary embodiment of the present invention.

Exemplary embodiments of the present invention will be described more fully hereinafter with reference to the accompanying drawings. As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals may designate like elements throughout the specification. It will be understood that when an element such as a layer, film, region, or substrate is referred to as being "on" another element, it can be directly on the other element or intervening elements may also be present.

Firstly, a liquid crystal display according to an exemplary embodiment of the present invention will be described with reference to FIG. 1 to FIG. 6.

Figure 3:
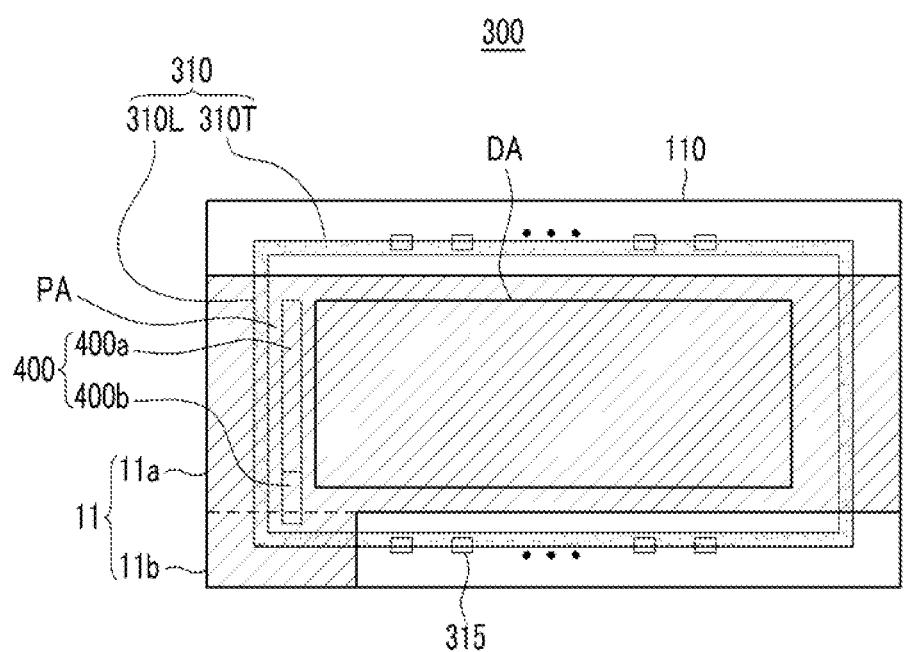
Figure 4:
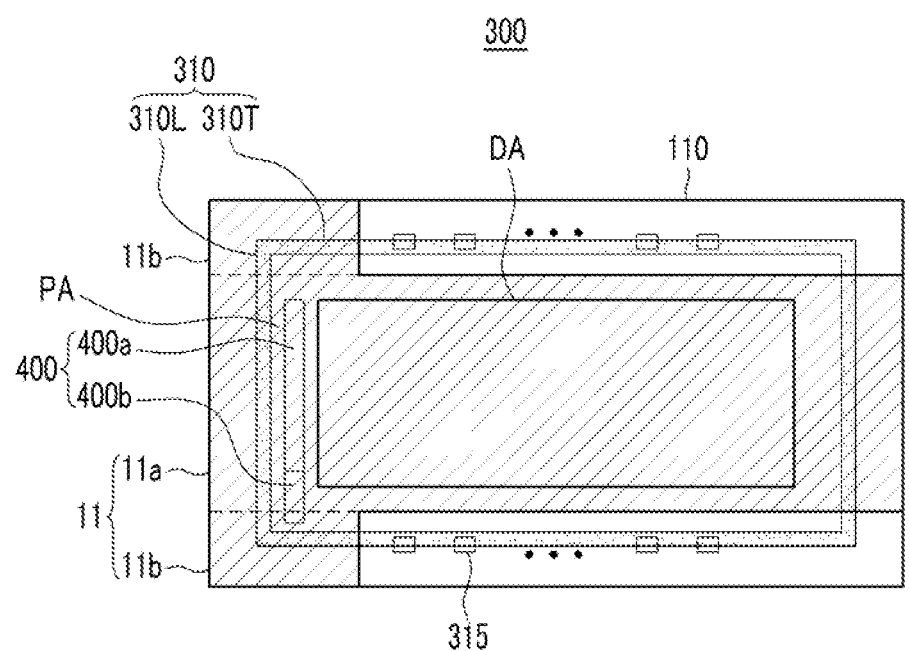
Figure 5:
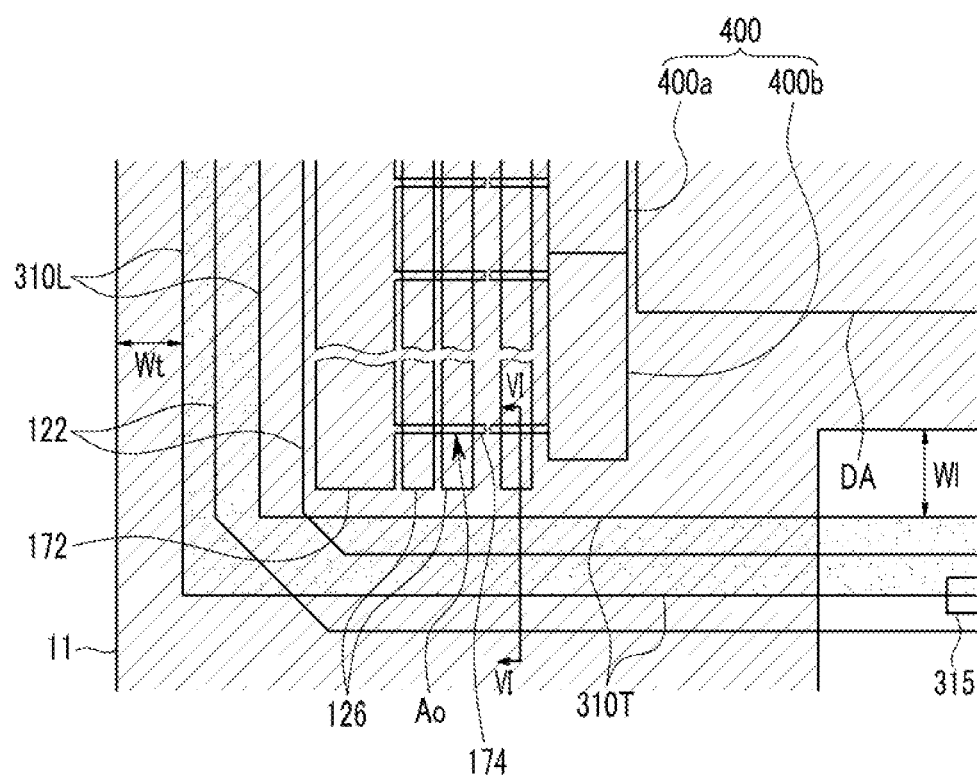
FIG. 5 is an enlarged view of a left lower portion of the liquid crystal display shown in FIG. 1, FIG. 2, FIG. 3, and FIG. 4.
Figure 6:
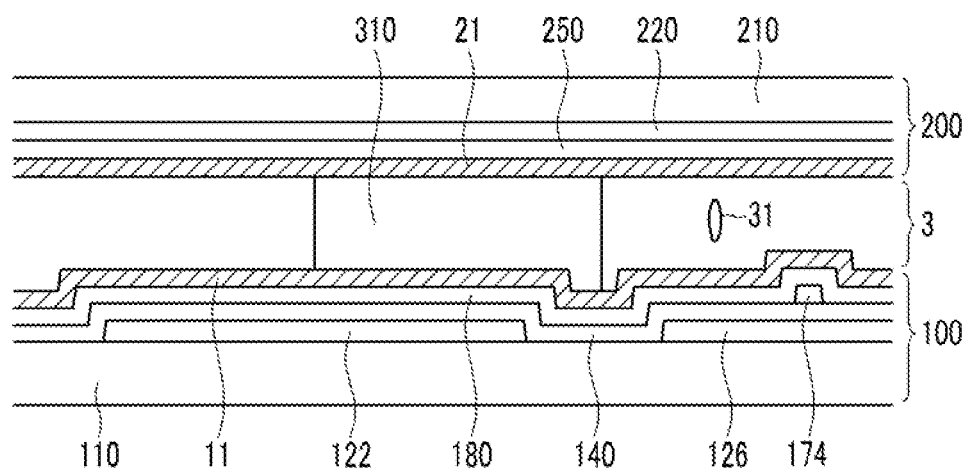
FIG. 6 is a cross-sectional view taken along the line VI-VI of FIG. 5.

FIG. 1, FIG. 2, FIG. 3, and FIG. 4 are layout views each showing a liquid crystal display according to an exemplary embodiment of the present invention. FIG. 5 is an enlarged view of a left lower portion of the liquid crystal display shown in FIG. 1, FIG. 2, FIG. 3, and FIG. 4. FIG. 6 is a cross-sectional view taken along the line VI-VI of FIG. 5.

A liquid crystal display 300 according to an exemplary embodiment of the present invention includes a display area DA displaying images and a peripheral area PA enclosing the display area DA. In a view of the structure shown in FIG. 6, the liquid crystal display includes a lower panel 100 and an upper panel 200 facing each other and a liquid crystal layer 3 interposed therebetween. The lower panel 100 and the upper panel 200 may also be divided into a display area DA and a peripheral area PA. The liquid crystal display according to an exemplary embodiment of the present invention may further include a backlight assembly (not shown) providing light to the lower panel 100, the upper panel 200, and the liquid crystal layer 3 to display images, and polarizers to control the transmittance of the light.

In the display area DA, several signal lines including a gate line transmitting a gate signal and a data line transmitting a data signal, a switching element connected to the gate line and the data line, and a pixel electrode connected to the switching element are provided on an insulation substrate 110 of the lower panel 100.

The gate line extends substantially in a transverse direction and the data line extends substantially in a longitudinal direction thereby intersecting the gate line. The gate line, the data line, the switching element, and the pixel electrode may be provided in the lower panel 100. In the upper panel 200, a common electrode facing the pixel electrode of the lower panel 100 and receiving a common voltage Vcom may be provided on an insulation substrate 210.

A color filter representing a primary color may be further provided in a region of the lower panel 100 or the upper panel 200 corresponding to each of the pixel electrodes.

The liquid crystal layer 3 has dielectric anisotropy, and the pixel electrode and the common electrode form a liquid crystal capacitor including the liquid crystal layer 3 as a dielectric material. The arrangement of liquid crystal molecules 31 of the liquid crystal layer 3 is changed according to a voltage difference between the pixel electrode and the common electrode, and thereby the polarization of the light passing through the liquid crystal layer 3 is changed. The change of the polarization coincides with a change in transmittance of light by the polarizer, and thereby the liquid crystal display is capable of displaying images.

Referring to FIG. 5, a gate driver 400 and a data driver (not shown) control signal lines 172 and 126 transmitting a control signal to the gate driver 400, a lower common electrode 122, a short portion 315 on the lower common electrode 122, and a combining member (hereinafter, referred to as a "sealant") 310 combining the lower panel 100 and the upper panel 200 to each other are formed in the peripheral area PA.

The gate driver 400 may be disposed on at least one of the left peripheral area PA or the right peripheral area PA with respect to the display area DA. The gate driver 400 is connected to the gate line of the display area DA to generate a gate signal, consisting of a combination of a gate-on voltage Von for turning on the switching element and a gate-off voltage Voff for turning off the switching element, and to apply the gate signal to the gate line. The gate driver 400 is substantially a shift register and includes a plurality of stages each connected to the gate lines and arranged in a longitudinal direction. The gate driver 400 may be formed by the same process as is used to form the switching element of the display area DA, and the gate driver 400 may be directly integrated on the insulation substrate 110 of the lower panel 100. However, the gate driver 400 may be mounted as an integrated circuit (IC) chip type.

The gate driver 400 includes an actual gate driver 400a and a dummy gate driver 400b. The actual gate driver 400a transmits the gate signal to the gate line connected to the pixel electrode of the display area DA. However, the dummy gate driver 400b does not transmit the gate signal to the gate line but rather assists the actual gate driver 400a in generating the gate signal. The dummy gate driver 400b may include two or more stages arranged in the longitudinal direction.

The data driver (not shown) may be mounted as a chip type in the lower panel 100 above the display area (DA). The data driver transmits the data signal to the data line of the display area DA.

The control signal lines 172 and 126 include a common voltage line 172 transmitting a common voltage Vss and a plurality of clock signal lines 126 transmitting a plurality of clock signals CLK.

Referring to FIG. 6, the common voltage line 172 and the clock signal lines 126 are disposed in different layers of the lower panel 100.

The clock signal lines 126 are formed on the insulation substrate 110, and are connected to each of the gate drivers 400 thereby transmitting the clock signal CLK.

The clock signal lines 126 may be formed with the same material as the lower common electrode 122 and the gate line of the display area DA in the same process thereof.

A gate insulating layer 140 is formed on the clock signal lines 126, and the common voltage line 172 is formed thereon. The common voltage line 172 includes a connection 174 and is connected to each state of the gate driver 400 through the connection 174 thereby transmitting the common voltage Vss. The connection 174 of the common voltage line 172 crosses the clock signal lines 126 in the transverse direction and overlaps the clock signal lines 126 thereby forming an overlapping region Ao. The common voltage line 172 may be formed with the same material as the data line of the display area DA in the same process thereof. A passivation layer 180 is formed on the common voltage line 172 and a conductive layer made of IZO or ITO may be further formed on the passivation layer 180.

The lower common electrode 122 transmits the common voltage Vcom that will be transmitted to the common electrode of the upper panel 200. The lower common electrode 122 is formed along an edge of the peripheral area PA. The lower common electrode 122 transmitting the common voltage Vcom is connected to the common electrode of the upper panel 200 through the short portion 315. As shown in FIG. 1, FIG. 2, FIG. 3, and FIG. 4, a plurality of short portions 315 may be provided on at least one position of the upper and lower portions of the liquid crystal display 300. As shown in FIG. 6, the lower common electrode 122 may be formed in the same layer as the clock signal lines 126.

The sealant 310 may be made of a hardening resin such as acryl epoxy resin. The sealant 310 encloses the display area DA and is formed between the lower panel 100 and the upper panel 200 thereby attaching the two display panels 100 and 200. The sealant 310 includes a pair of longitudinal portions 310L extending along the gate driver 400 and a pair of transverse portions 310T connecting them. At least a portion of the short portion 315 may overlap at least a portion of the transverse portion 310T of the sealant 310.

Referring to FIG. 1 to FIG. 6, an alignment layer 11 is coated on the passivation layer 180 of the lower panel 100 of the entire display area DA and a portion of the peripheral area PA. The alignment layer 11 for controlling alignment directions and alignment angles of the liquid crystal molecules 31 of the liquid crystal layer 3 includes a first region 11a and at least one second region 11b connected to the first region 11a.

The first region 11a has a substantially rectangular shape and extends in the transverse direction such that the first region 11a completely overlaps the longitudinal portion 310L of the sealant 310. Accordingly, the first region 11a completely covers the common voltage line 172 and the clock signal lines 126 that are disposed on the side of the actual gate driver 400a and the first region 11a also covers the actual gate driver 400a of the gate driver 400. Referring to FIG. 5, the distance Wt between the left edge of the longitudinal portion 310L of the sealant 310 and the left edge of the first region 11a may be maintained at more than a predetermined distance (e.g. 1.5 mm or 2 mm) to prevent degradation of the adhesion characteristics of the sealant 310.

The first region 11a of the alignment layer 11 does not overlap the transverse portion 310T of the sealant 310 and the distance Wl between the first region 11a and the inner edge of the transverse portion 310T of the sealant 310 may be maintained at more than a predetermined distance (e.g. 1.5 mm or 2 mm).

The first region 11a may overlap at least a portion of the dummy gate driver 400b. Alternatively, the first region 11a does not overlap any portion of the dummy gate driver 400b. Likewise, the first region 11a may overlap the portion of the common voltage line 172 and the clock signal line 126 disposed on the side of the dummy gate driver 400b and alternatively, the first region 11a does not overlap any portion of the common voltage line 172.

Unlike the configuration shown in FIG. 1, FIG. 2, FIG. 3, and FIG. 4, the first region 11a of the alignment layer 11 may be formed up to the portion that does not arrive at the right and left edges of the substrate 110.

Referring to FIG. 1, the second region 11b has a substantially rectangular shape and has a smaller area than the first region 11a. The second region 11b is connected to the left and right lower edge of the first region 11a in the longitudinal direction. The left longitudinal edge of the second region 11b connected to the left lower edge of the first region 11a is aligned with the same line as the left longitudinal edge of the first region 11a and the right longitudinal edge of the second region 11b connected to the right lower edge of the first region 11a is aligned with the same line as the right longitudinal edge of the first region 11a.

When any of the gate driver 400, the common voltage line 172, and the clock signal line 126 are not covered by the first region 11a, the second region 11b completely covers them and is extended to the lower transverse edge of the substrate 110. Accordingly, the alignment layer 11 may cover all of the stages of the gate driver 400, the common voltage line 172, and the clock signal line 126. Also, the second region 11b completely overlaps the lower portion of the longitudinal portion 310L of the sealant 310 and the distance Wt between the edge of the longitudinal portion 310L of the sealant 310 and the longitudinal edge of the second region 11b may be maintained at more than a predetermined distance (e.g. 1.5 mm or 2 mm) to prevent degradation of adhesion characteristics of the sealant 310.

Figure 2:
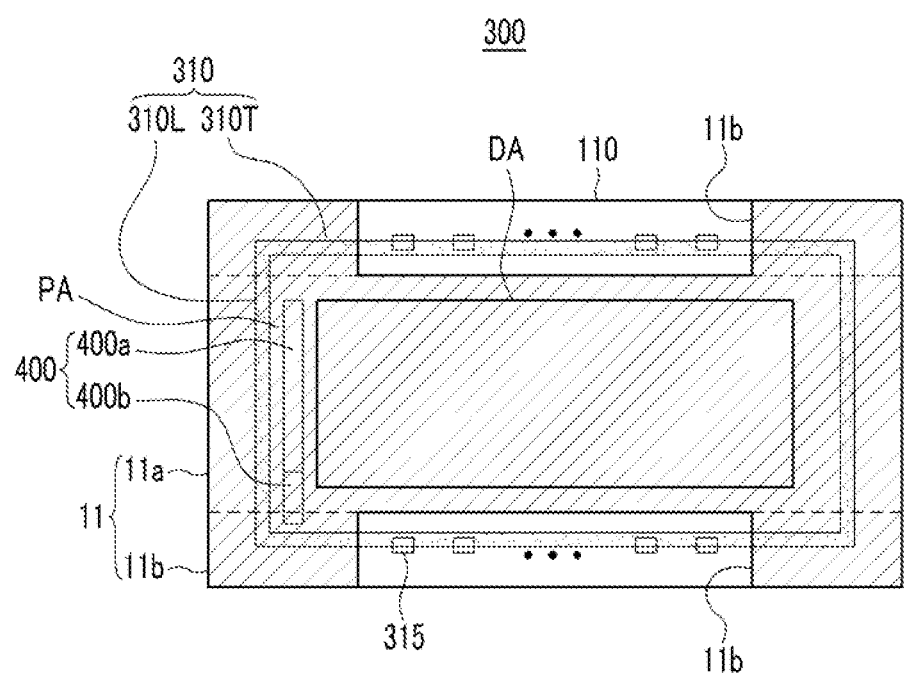

Referring to FIG. 2, a second region 11b may be connected to the left and right upper edges of the first region 11a, as well as the left and right lower edges of the first region 11a, in the longitudinal direction. The second region 11b disposed at one of the left and right upper edges of the first region 11a may be omitted.

Referring to FIG. 3, the second region 11b may be connected only to the left lower edge of the first region 11a in the longitudinal direction. In this case, the gate driver 400 may be disposed only at the left side of the peripheral area PA. Referring to FIG. 4, the second region 11b may be connected to the left upper edge of the first region 11a as well as the left lower edge of the first region 11a in the longitudinal direction.

The position and the shape of the second region 11b of the alignment layer 11 may be variously changed according to the position of the gate driver 400 and the control signal lines 172 and 126.

The alignment layer 11 does not overlap the short portion 315.

As described above, in the peripheral area PA, the second region 11b of the alignment layer 11 may be formed at the left or right side of the lower or upper edge of the first region 11a so that the alignment layer 11 may completely cover the region where the gate driver 400 and the control signal lines for transmitting the control signals to the gate driver 400 are positioned. Accordingly, generation of a short circuit at an overlapping region of two control signal lines formed in different layers and a large voltage difference between the transmitted signals, e.g., the overlapping region Ao between the common voltage line 172 and the clock signal line 126 may be prevented.

According to an exemplary embodiment of the present invention, the alignment layer 11 may prevent deterioration in the adjacent insulating layer located between two control signal lines or nearby due to a large voltage difference between two overlapping control signal lines and may prevent a short circuit between the two control signal lines. Further, since no portion of the alignment layer 11 overlaps the short portion 315, the common voltage Vcom may be normally transmitted from the lower panel 100 to the common electrode of the upper panel 200. Also, the alignment layer 11 maintains spacing over a predetermined distance between the edge of the sealant 310 or alternatively, the alignment layer 11 completely overlaps the sealant 310 such that deterioration of the contact characteristic of the sealant 310 may be prevented.

For example, although the first region 11a is designed to cover all of the dummy gate driver 400b of the gate driver 400 and the common voltage line 172 and the clock signal line 126 beside the dummy gate driver 400b, the position of the edge of the alignment layer 11 may be altered by a margin in the manufacturing process of the liquid crystal display such that all of the dummy gate driver 400b of the gate driver 400 and the common voltage line 172 and the clock signal line 126 beside the dummy gate driver 400b are not covered, as arranged. However, according to an exemplary embodiment of the present invention, the second region 11b is formed such that all of the dummy gate driver 400b and the common voltage line 172 and the clock signal line 126 beside the dummy gate driver 400b may always be covered regardless of alteration of a position of the edge of the alignment layer 11 by the margin, an thereby a short circuit may be prevented at the overlapping region Ao of the common voltage line 172 and the clock signal line 126.

A light blocking member 220 and an overcoat 250 for preventing light leakage is formed on the insulation substrate 210 of the upper panel 200 of the peripheral area PA and an alignment layer 21 is formed thereon. As opposed to the arrangement illustrated in FIG. 6, the light blocking member 220 may be formed in the lower panel 100 and a color filter (not shown) may be formed in the lower panel 100. In this case, the overcoat 250 may be omitted. Also, as opposed to the arrangement illustrated in FIG. 6, the upper panel 200 may not be extended to the peripheral area PA.

Now, a manufacturing method of a liquid crystal display 300 will be described with reference to FIG. 7 and FIG. 8 as well as FIG. 1 to FIG. 6.

Figure 7:
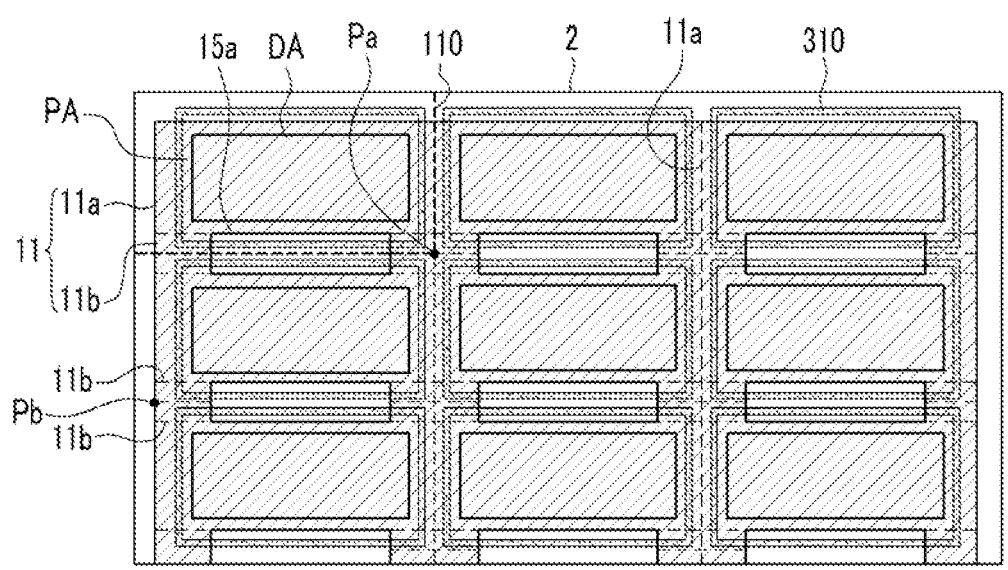
FIG. 7 and FIG. 8 are layout views each showing a mother substrate coated with an alignment layer in a manufacturing method of a liquid crystal display according to an exemplary embodiment of the present invention.
Figure 8:
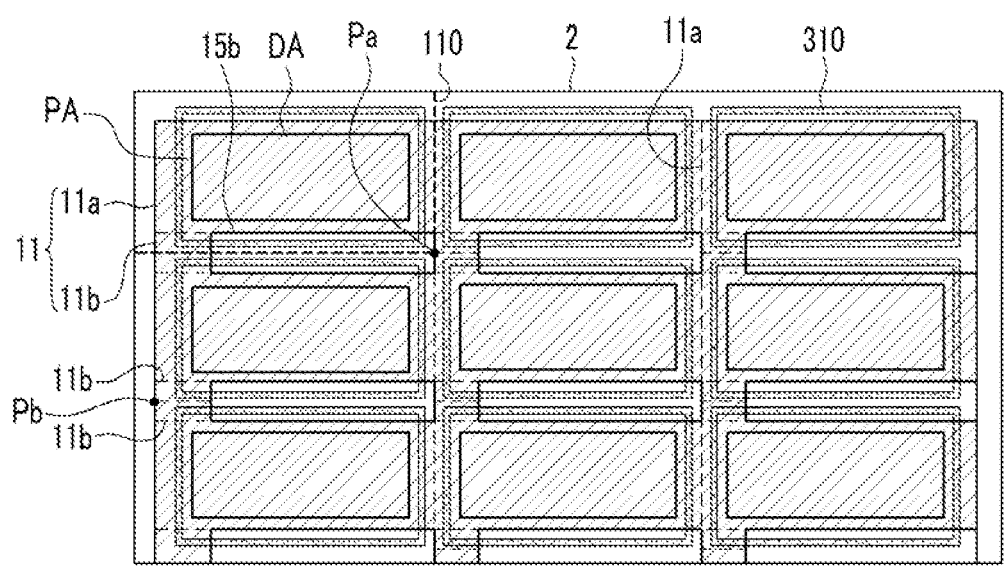

FIG. 7 and FIG. 8 are layout views each showing a mother substrate coated with an alignment layer in a manufacturing method of a liquid crystal display according to an exemplary embodiment of the present invention.

To manufacture a liquid crystal display 300 according to an exemplary embodiment of the present invention, a mother substrate 2 including a plurality of insulation substrates 110 arranged in a matrix and combined to each other is provided. The mother substrate 2 includes a plurality of display areas DA and peripheral areas PA enclosing each display area DA arranged in the matrix, as shown in FIG. 7 and FIG. 8. Each insulation substrate 110 includes one display area DA and one peripheral area PA.

A display element and a driving element such as a plurality of gate lines, a plurality of data lines, a plurality of switching elements, a plurality of lower common voltage lines, a plurality of control signal lines, and a plurality of gate driver 400 are formed on the mother substrate 2 and a passivation layer 180 is deposited thereon. In FIG. 7 and FIG. 8, the mother substrate 2 includes nine insulation substrates 110; however the invention is not limited thereto and may include various numbers of substrates 110.

An alignment layer 11 made of a polymer material such as a polyimide is coated on the passivation layer 180 and is treated by rubbing to complete the lower panel 100.

As shown in FIG. 7, the alignment layer 11 includes a plurality of first regions 11a each continuously covering a plurality of insulation substrates 110 that are arranged in the row direction and a plurality of second regions 11b each connecting first regions 11a neighboring in the column direction. Four second regions 11b covering four substrates 110 neighboring each other with respect to the apex Pa or two second region 11b covering two substrates 110 neighboring each other with respect to the apex Pb are connected to each other with respect to the apexes Pa and Pb to form one approximate rectangle. The alignment layer 11 has a plurality of openings 15a and 15b arranged in a matrix form and separated from each other by a predetermined interval on the viewpoint of the entire mother substrate 2. The area of the opening 15a shown in FIG. 7 is smaller than the area of the opening 15b shown in FIG. 8. The openings 15a and 15b overlap a short portion 315 to connect the lower common electrode of the lower panel 100 to the common electrode of the upper panel 200 as shown in FIG. 4 and FIG. 5.

When designing the alignment layer 11 as shown in FIG. 7, if the substrates 110 positioned in the first row are divided, the shape of the alignment layer 11 of the liquid crystal display shown in FIG. 1 as described above may be obtained and if the substrates 110 positioned in the second row and the row thereunder are divided, the same shape as the alignment layer 11 of the liquid crystal display shown in FIG. 2 may be obtained.

When designing the alignment layer 11 as shown in FIG. 8, if the substrates 110 positioned in the first row are divided, the shape of the alignment layer 11 of the liquid crystal display shown in FIG. 3 as described above may be obtained and if the substrates 110 positioned in the second row and the row thereunder are divided, the same shape as the alignment layer 11 of the liquid crystal display shown in FIG. 4 may be obtained.

As opposed to the arrangement illustrated in FIG. 8, the second region 11b that is disposed downward among two second regions 11b neighboring in the vertical direction and connected to each other, for example, the second region 11b that is disposed on the left upper side of an insulation substrate 110, may be omitted. In this case, the alignment layer 11 of the liquid crystal display as shown in FIG. 3 may be obtained.

Another mother substrate (not shown) including a plurality of insulation substrates 210 arranged in a matrix is further provided. A light blocking member 220, a color filter 230, and an overcoat 250 are sequentially formed on the other mother substrate. An alignment layer 21 is coated thereon and treated to complete the upper panel 200. The alignment layer 21 of the upper panel 200 may have the same shape as the alignment layer 11 of the lower panel 100.

Next, while maintaining a uniform cell gap between the completed lower panel 100 and upper panel 200, a sealant 310 made of a thermal hardening resin or ultraviolet ray hardening resin is coated between the lower panel 100 and the upper panel 200 and the two display panels 100 and 200 are combined.

Next, the two combined display panels 100 and 200 are cut into cell units to divide into individual sets of insulation substrates 110 and 210.

Next, the space enclosed by the sealant 310 between the two display panels 100 and 200 is filled with liquid crystal to form a liquid crystal layer 3.

Accordingly, a liquid crystal display shown in FIG. 1 to FIG. 6 may be completed.

In the peripheral area of the liquid crystal display, an alignment layer completely covers the region where the gate driver and the control signal line transmitting the control signal to the gate driver are disposed. Accordingly, the generation of a short circuit at an overlapping region of two control signal lines that are formed in different layers from each other and having a large voltage difference between the transmitted signals may be prevented.

While exemplary embodiments of the present invention have been described herein, it is to be understood that the invention is not limited to the disclosed embodiments.

What is claimed is:

1. A liquid crystal display comprising:
a lower panel and an upper panel facing each other;
a liquid crystal layer interposed between the lower panel and the upper panel;
an attachment member, attaching the lower panel and the upper panel to each other and enclosing the liquid crystal layer;
a gate driver integrated on the lower panel, the gate driver generating a gate signal and including a plurality of stages arranged in a first direction, wherein the gate driver is disposed within an inner area defined by the attachment member;
a plurality of control signal lines transmitting a control signal to the gate driver and extending in the first direction;
a passivation layer disposed on the gate driver and the plurality of control signal lines; and
an alignment layer disposed on the passivation layer, the alignment layer aligning the liquid crystal layer and completely covering the gate driver and the plurality of control signal lines;
wherein the alignment layer includes a first region extending in a second direction, transverse to the first direction, and a second region connected to the first region in the first direction, and the second region extends to reach an edge of the lower panel extending in the second direction, and
wherein at least two corners of the attachment member are entirely covered by the second region while a portion of the attachment member located between the at least two entirely covered corners remains uncovered.

2. The liquid crystal display of claim 1, wherein the attachment member includes first and second portions each arranged in the first direction and facing each other and third and fourth portions each arranged in the second direction and facing each other, the first region of the alignment layer completely overlaps each of the first and second portions of the attachment member in the second direction, and a distance between an edge of the first region of the alignment layer with respect to the first direction and an edge of the first and second portions of the attachment member with respect to the first direction is greater than a predetermined first distance.

3. The liquid crystal display of claim 2, wherein the lower panel and the upper panel each include a display area displaying an image and a peripheral area around the display area, and the gate driver, the plurality of control signal lines, and the attachment member are positioned in the peripheral area.

4. The liquid crystal display of claim 3, wherein the gate driver includes an actual gate driver connected to a plurality of gate lines of the display area and transmitting the gate signal to the plurality of gate lines, and a dummy gate driver connected to the actual gate driver in the first direction.

5. The liquid crystal display of claim 4, wherein the second region of the alignment layer covers at least a portion of the dummy gate driver and at least a portion of the plurality of control signal lines disposed beside the dummy gate driver.

6. The liquid crystal display of claim 3, wherein the plurality of control signal lines include a first control signal line transmitting a first control signal and a second control signal line transmitting a second control signal that is different from the first control signal, the first control signal line and the second control signal line are disposed under the passivation layer, and at least a portion of the first control signal line overlaps the second control signal line via an insulating layer.

7. The liquid crystal display of claim 1, wherein the lower panel and the upper panel each include a display area displaying an image and a peripheral area around the display area, and the gate driver, the plurality of control signal lines, and the attachment member are positioned in the peripheral area.

8. The liquid crystal display of claim 7, wherein the gate driver includes an actual gate driver connected to a plurality of gate lines of the display area and transmitting the gate signal to the plurality of gate lines, and a dummy gate driver connected to the actual gate driver in the first direction.

9. The liquid crystal display of claim 8, wherein the second region of the alignment layer covers at least a portion of the dummy gate driver and at least a portion of the plurality of control signal lines disposed beside the dummy gate driver.

10. The liquid crystal display of claim 7, wherein:
the plurality of control signal lines include a first control signal line transmitting a first control signal and a second control signal line transmitting a second control signal that is different from the first control signal;

the first control signal lines and the second control signal lines are disposed under the passivation layer; and at least a portion of each first control signal line overlaps a second control signal line via an insulating layer.

11. The liquid crystal display of claim 10, further comprising:

a lower common electrode formed on the lower panel and transmitting the common voltage Vcom; and an upper common electrode formed on the upper panel, wherein the lower common electrode is connected to the upper common electrode through a short portion, the attachment member includes first and second portions arranged in the first direction and facing each other and third and fourth portions arranged in the second direction and facing each other, at least a portion of the short portion overlaps at least a portion of the third and fourth portions of the attachment member, and the alignment layer does not overlap the short portion.

12. The liquid crystal display of claim 1, wherein:

the plurality of control signal lines include a first control signal line transmitting a first control signal and a second control signal line transmitting a second control signal that is different from the first control signal;

the first control signal line and the second control signal line are disposed under the passivation layer; and at least a portion of first control signal line overlaps a second control signal line via an insulating layer.

13. The liquid crystal display of claim 12, further comprising:

a lower common electrode formed on the lower panel and transmitting the common voltage Vcom; and an upper common electrode formed on the upper panel, wherein the lower common electrode is connected to the upper common electrode through a short portion, the attachment member includes first and second portions arranged in the first direction and facing each other and third and fourth portions arranged in the second direction and facing each other, at least a portion of the short portion overlaps at least a portion of the third and fourth portions of the combining member, and the alignment layer does not overlap the short portion.

14. The liquid crystal display of claim 1, further comprising:

a lower common electrode formed on the lower panel and transmitting the common voltage Vcom; and an upper common electrode formed on the upper panel, wherein the lower common electrode is connected to the upper common electrode through a short portion, the attachment member includes first and second portions arranged in the first direction and facing each other and third and fourth portions arranged in the second direction and facing each other, at least a portion of the short portion least a portion of the third and fourth portions of the attachment member, and the alignment layer does not overlap the short portion.

15. The liquid crystal display of claim 6, further comprising:

a lower common electrode formed on the lower panel and transmitting a common voltage Vcom; and an upper common electrode formed on the upper panel, wherein the lower common electrode is connected to the upper common electrode through a short portion, at least a portion of the short portion overlaps at least a portion of the third and fourth portions of the attachment member, and the alignment layer does not overlap the short portion.

* * * * *